Figure 1:
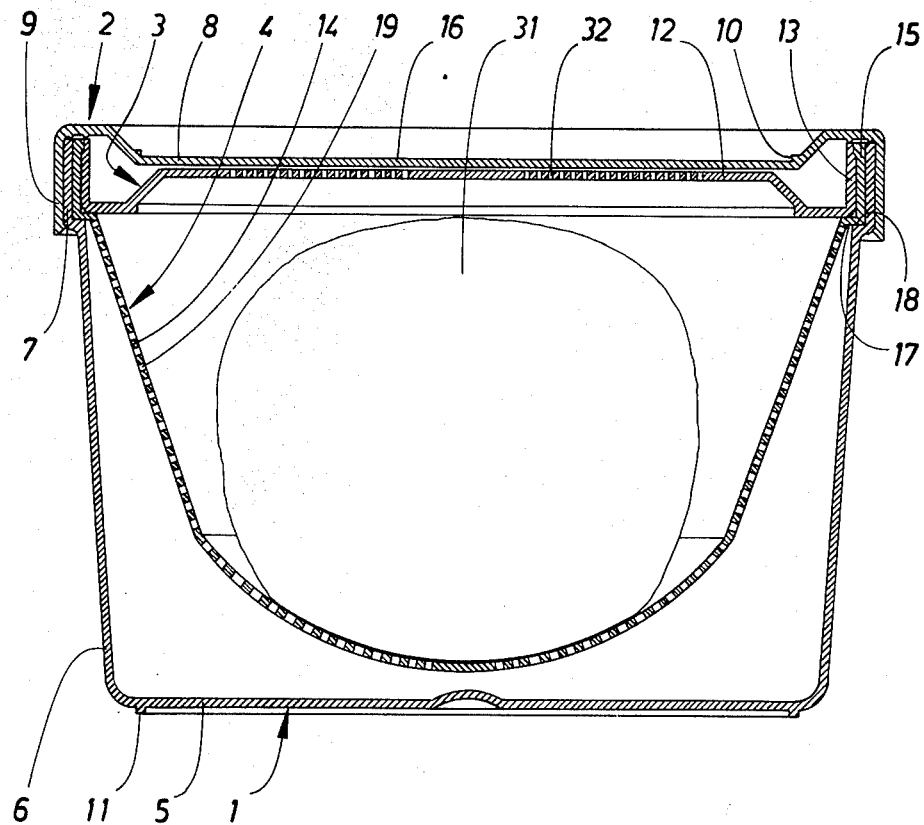

United States Patent [19]

Gustafsson

[11] 4,319,679
[45] Mar. 16, 1982

[54] STORAGE DEVICE FOR BODIES, WHICH SHALL BE EXPOSED TO THE ENVIRONMENT SUCH AS BODIES FOR THE ABSORPTION OF HUMIDITY

[75] Inventor: Bror Gustafsson, Gislaved, Sweden

[73] Assignee: Handelsbolaget Zeidler Holmgren, Göteborg, Sweden

[21] Appl. No.: 135,986

[22] Filed: Mar. 31, 1980

[30] Foreign Application Priority Data

Jan. 16, 1980 [SE] Sweden ............................ 8000345

[51] Int. Cl.³ .............................................. F17C 1/00
[52] U.S. Cl. ...................................... 206/0.5; 55/384; 55/387; 220/408; 220/23.4; 206/204
[58] Field of Search ......................... 55/384, 387–389, 55/515, 350, 484; 210/689; 150/0.5; 220/23.4, 408; 206/205, 204, 213.1, 524.5, 0.5; 312/31.01, 31.03

[56] References Cited

U.S. PATENT DOCUMENTS 1,268,053  5/1918  Poetschke ........................... 55/388
1,787,231 12/1930  Bacon ................................. 55/387
3,074,773  1/1963  Salgado .............................. 220/23
3,167,079  1/1965  Weil ................................... 220/23

FOREIGN PATENT DOCUMENTS 1258832  1/1968  Fed. Rep. of Germany .

Primary Examiner—Bernard Nozick

[57] ABSTRACT

Storage device for bodies, which shall be exposed to the environment, such as bodies for the absorption of humidity. The device comprises a perforated support, arranged to carry the body and a container which is arranged to support said support and to form a space under the same. An additional part is provided with an edge portion, from which a perforated, for example dome-shaped, protruding portion projects, adapted to at least substantially accommodate the body, the container having an edge portion, which is arranged to carry the edge portion of the additional part in alternative positions with the protruding part either turned inwards in a storage condition and enclosed in the container or outwards extending from the edge portion of the container in a condition of use.

2 Claims, 5 Drawing Figures

STORAGE DEVICE FOR BODIES, WHICH SHALL BE EXPOSED TO THE ENVIRONMENT SUCH AS BODIES FOR THE ABSORPTION OF HUMIDITY

The present invention relates to a storage device for bodies, which shall be exposed to the environment, such as bodies for the absorption of humidity.

Certain effects can be obtained by bringing certain materials in contact with the environment or atmosphere i.e. the surrounding air or a gas. The effect, which is primarily intended in this connection, concerns dehumidification of gases by bringing them in contact with a hygroscopic humidity-absorbing material. In the first place solid materials are concerned, which absorb water, in which they are dissolved during the process forming a solution, which is drained off. Calcium chloride can be mentioned as an example of such materials. In connection with the utilization of such materials, it is by way of example known from the German patent publication No. 1,258,832 to support the material on a grid or similar above a collecting vessel for the solution, the gas, which shall be dehumidified, being led over said material. The material, which may be calcium chloride, then absorbs the water in the gas, and a certain portion of it is thereby dissolved and drips down into the collecting vessel. The device according to the German publication is of permanent character and is intended to form part of a greater installation. If the dehumidifying process shall be interrupted, either the vessel must be closed by means of valves or similar, or the material must be removed and lowered down into an airtight receptacle. The device according to the German publication is therefore not very well adapted to dehumidifying needs of more general nature, where the device does not form part of any special apparatus or where there is only an occasional need for a dehumidification device.

It is an object of the present invention to provide a storage device, which in the first place is intended for hygroscopic materials, which are gradually dissolved during the dehumidifying process, which device is well adapted for the storage of the material in an inactivated condition, thus separated from the environment by means of an airtight container, and to serve as an accommodating means during its exposure to the environment, the device in question providing that the material gets a good contact with the surrounding air at the same time as a drainage facility is provided.

Another object, which can be obtained by means of the invention, consists in providing a device of the kind mentioned, which by simple means can be adapted with respect to its capacity.

The objects of the invention are obtained by means of a device which comprises a perforated support, arranged to carry the body, provided to absorb the humidity and a container which is arranged to support said support and to form a space under the same. According to the invention one additional part is provided with an edge portion, from which a perforated, for example dome-shaped, protruding portion projects, adapted to at least substantially accomodate the body, the container, having an edge portion, which is arranged to carry the edge portion of the additional part in alternative positions with the protruding part either turned inwards and enclosed in the container or outwards extending from the edge portion of the container.

Figure 2:
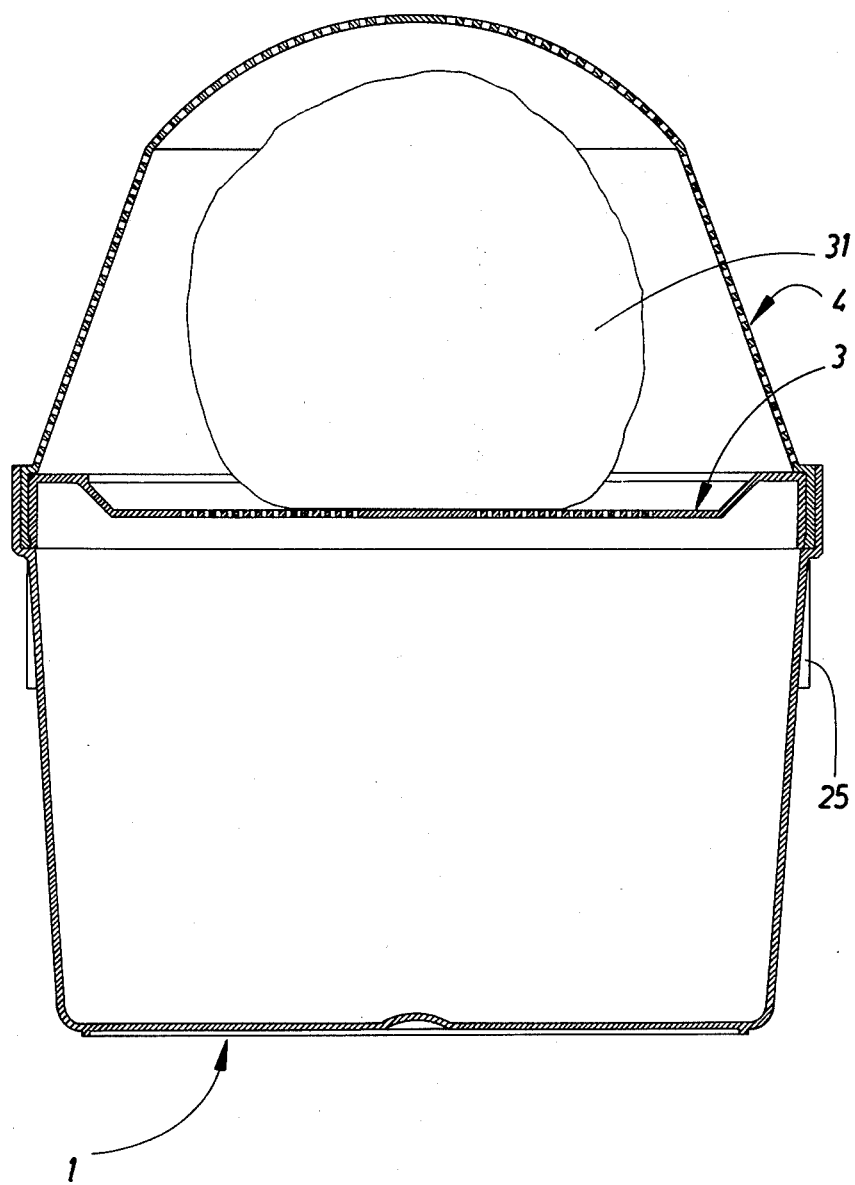
Figure 3:
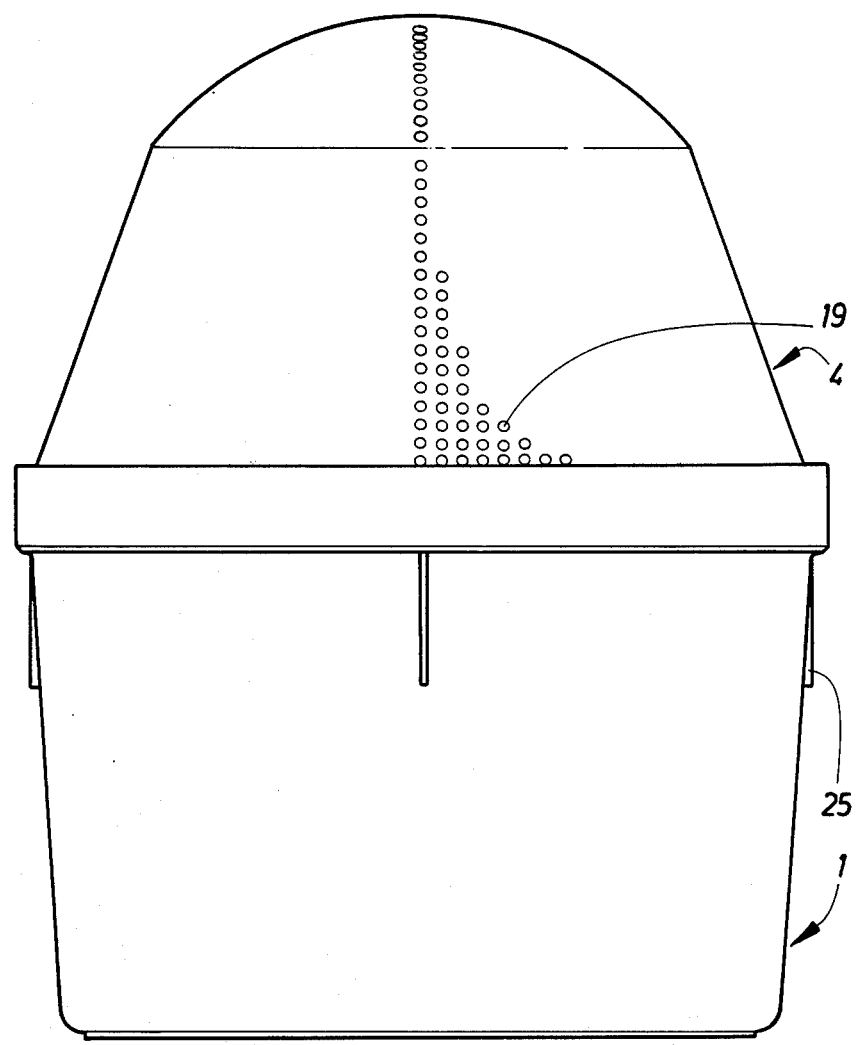
Figure 4:
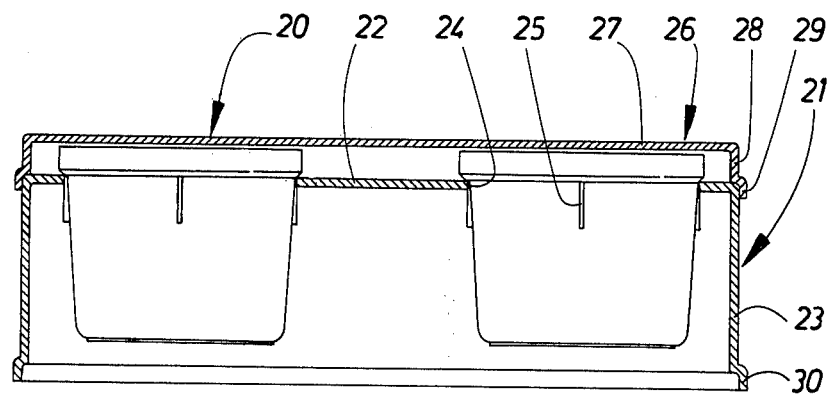
Figure 5:
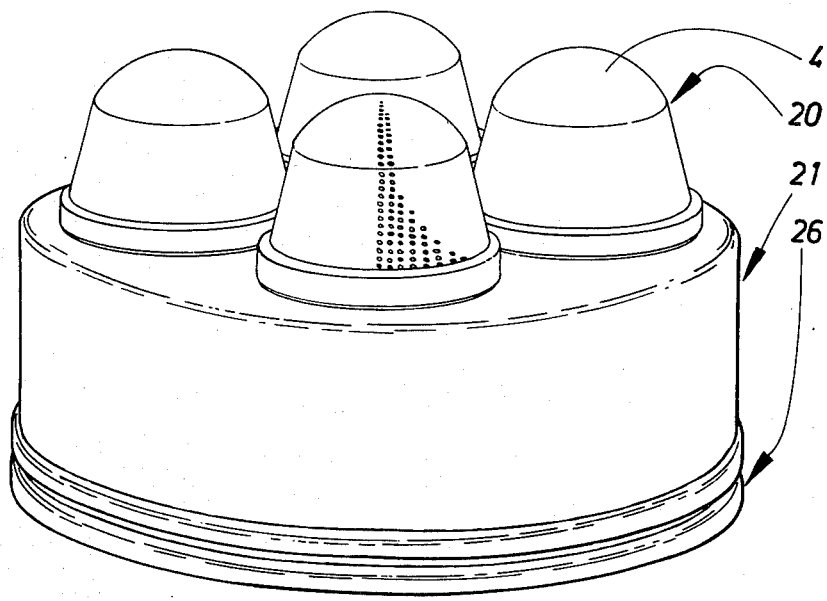

In the accompanying drawings two examples of embodiment of the invention are shown and will now be described in the following. In FIGS. 1 and 2 the device is shown in cross-sectional views in two conditions of use. FIG. 3 is a side elevational view of the device, the three figures having reference to the first embodiment. In FIGS. 4 and 5 the second embodiment is shown in a cross-sectional and a perspective view respectively.

According to FIGS. 1–3 a storage device according to the invention in its complete condition comprises four parts, viz. a container 1, a lid 2, a support 3, and a dome-shaped additional part 4. The container comprises a bottom 5, sides 6, which are slightly conical, and a somewhat widened brim 7, which forms an opening. The lid 2 has a flat portion 8, which constitutes the very lid, and a cylindrical brim 9, which is adapted to the outside of the brim 7 of the container 1. The flat portion 8 has a recess 10, which is adapted to a ring 11 of the bottom 5 of the container 1, by means of which ring several packing units staples on top of each other are prevented from sliding sideways and instead form a well defined staple. The support 3 like the lid 2 has a flat portion 12 and a cylindrical brim 13. The flat portion 12 is provided with a central portion, which is displaced relative to its edge portion and provided with a great number of holes 32. The dome-shaped part 4 has a vaulted portion 14, terminating in a brim 15, the outside of which is adapted to the inside of the brim 7 of the container 1. When the dome-shaped part 4 is inserted into the container 1 in the manner illustrated in FIG. 1, the dome-shaped part is supported by a projecting edge 17, resting on an inwards directed edge 18, where the brim 7 of the container 1 blends into the side 6. The vaulted portion 14 is provided with a great number of holes 19. As is also evident from FIG. 1, the outside of the brim 13 of the support 3 is adapted to the inside of the brim 15 of the dome-shaped part 4. As is evident from FIGS. 1 and 2 the different brims have projecting portions, which function as snap-on joints, when the different parts are assembled, it being assumed that they are made of an elastic material, by way of example hard or semi-hard plastic.

The second embodiment according to FIGS. 4 and 5 also comprises four of the storage devices illustrated in FIGS. 1 and 2, and they are indicated with 20. A holder 21 in the form of a cylindrical receptacle with a bottom 22 and sides 23 is provided in order to hold the devices 20 together. In the bottom 22 there are four openings 24, which are adapted for insertion of the devices 20. Said devices then rest against the projecting edge of the brim 7 of the respective containers 1. The sides 6 of the containers are provided with protruding ribs 25, which serve as guides in the holes 24. A lid 26 also forms part of the device and has a flat portion 27 and sides 28, which terminate in an edge portion 29, which is adapted to the holder 21, so that the lid can be snapped-on the holder. The sides 29 of the holder 21 terminate in a widened edge portion 30, which in its turn is adapted to the lid 26, by means of which arrangement several devices can be stapled on top of each other without any risk of displacement in sideways direction.

The device according to the two examples of embodiment described has been characterized as a storage device. It has been stated that it is in the first place intended for humidity absorbing bodies, for which a drainage is desired. Such a body is indicated with 31 in FIGS. 1 and 2. It can consist of calcium chloride, which material is highly hygroscopic. Also other materials can be imagined, and sodium chloride has by way of example been used for the purpose in question. It can be suitable to mix different materials for example in order to conserve the solid consistency of the body, thus, in order to separate the solid phase from the fluid phase in such a definite manner that the body cannot entirely or for a greater part acquire a fluid state, and this also with respect to the portions of the same that have not yet been dissolved. Such a condition can be obtained by arranging a better drainage of the solution formed by the absorbed water, where at the same time it is achieved that the remaining not dissolved portion does not get clogged by the solution formed, but can continue to exercise its dehumidifying effect. However, as will be mentioned later, the packing device according to the invention can also be used with other materials than such ones that are dehumidifying and thereby yield a liquid, which shall be drained off.

When the device is in storage condition, the body 31 enclosed in the same shall be protected from environmental influence, the device, thus, so to say being inactivated. It is then in the condition according to FIG. 1. The dome-shaped part 4 is turned inwards with its dome-like portion 14 submerged in the container 1. The brim 15 then, as mentioned, rests with its edge 17 against the edge 18 at the terminal inner portion of the brim 7. The body 31 is placed in the space formed by the inverted dome-shaped portion 14.

The support 3 is mounted on top of the dome-shaped part 4, its brim 13 being snapped-in in the brim 15 of the dome-shaped part 4. The lid 2 is with its brim 9 snapped-on on the outside of the brim 7 of the container 1. The two brims then occupy a position in a tight fit-up to each other. As the container 1 and the lid 2 constitute a complete cover without any openings, a completely airtight enclosure of the body 31 is obtained. At the same time it rests on the perforated dome-shaped part 4, so that possibly formed liquid can be drained off, whereby the body can conserve its dry condition.

When the device shall be activated, i.e. the body shall be brought in contact with the atmosphere, the lid 2 is first removed, whereafter the support 3 is taken out. Now the dome-shaped part 4 with the enclosed body 31 can be lifted up, and the support 3 can in reverse position be snapped-in in the dome-shaped part 4, as shown in FIG. 2. The dome-shaped part 4 with its dome-shaped portion 14 now pointing in outwards direction, is attached to the container 1, as is shown in FIG. 2. In this position the body 31 through the holes 19 of the dome-shaped part 3 obtains a good contact with the environment. At the same time the support 3 forms a rest for the body 31, which rest is recessed by its displaced mid-portion being directed downwards. Liquid yielded by the body 31 can be drained off through the holes 32 of the support 3 and tricle down in the container 1.

If it is desired to insulate the body 31 from the environment, i.e. inactivate the same, one proceeds in the reverse order, so that the condition according to FIG. 1 is restored. Before the dome-shaped part 4 is lowered down into the position illustrated in FIG. 1, possibly accumulated liquid in the receptacle part 1 should be emptied.

In the device according to the second embodiment, the part 21 is a holder for, as shown in FIGS. 4 and 5, four units of the device shown in FIGS. 1 and 2. Thus, it is possible to obtain a compound device, which develops a greater effect than when a single device according to FIGS. 1 and 2 is separately used. In the storage condition each one of the units then individually has the condition shown in FIG. 1, and they are consequently inactivated with respect to their effect. As in this condition the dome-shaped part 4 is turned inwards, the lid 26 can be put on, as is shown in FIG. 4. The respective devices 20 are then held between the lid and the bottom 22.

When the device is made ready to function, the lid 26 is removed and a desired number of devices is brought into active condition by turning the dome-shaped part 4 outwards, as is shown in FIG. 2. FIG. 5 illustrates how this has been performed with all four units 20 supported by the stand 21. However, the effect can be regulated by a suitably chosen number of devices being set working. It is also within the scope of the invention that the stand 21 can be designed for a different number of individual packings than four, and it can be a smaller as well as a greater number of units.

The storage device, as already mentioned, is in the first place intended for hygroscopic materials, which require drainage during the humidity absorption process. However, the device can also be utilized for other purposes, and thus, also where the body 31 is made of another material than the one mentioned. For the dehumidification process silica gel can by way of example be used, and this material does not require any drainage. Another use can be in connection with air purifiers, i.e. the body can be of the kind yielding a scent or comprise a material bonding complex molecules of gases. Such a material is activated carbon. In this case the container for collection of any liquid is thus not required, but the device offers the advantage of forming a completely closed container for the body, which container can be changed to an exposing device for the body, in which it gets a very good contact with the environment, thus, in the first place with the surrounding air, which can stream around the body on all sides, a contribution to this effect being made by the perforated support. Thus, the perforated support with the underlying air-filled space is of importance for the function, even if any drainage shall not take place.

I claim:

1. A storage device for a body which is to be exposed to the environment such as for absorption of humidity, comprising:

an imperforate container having a bottom and a wall connected at one end thereof to said bottom and having an elongate skirt on another end thereof, said container skirt having an upper rim, and said container wall including an offset portion located near said skirt, said offset portion defining a first shoulder;

a body enclosing portion accommodated inside said container to prevent communication between a body stored inside said body enclosing portion and the environment, said body enclosing portion including a cup portion having a wall which includes a perforated dome-shaped portion and a curved wall, said curved wall having an upper rim and being offset from said dome-shaped portion to define a second shoulder, said dome-shaped portion having a body-supporting apex remote from said upper rim;

a support means having a perforate central section and an elongate wall having an upper rim which is offset from said central section, said support means wall being attached to said central section, said central section including a body-supporting section;

said second shoulder supported on said first shoulder and said body enclosing support means supported on said second shoulder so that said dome-shaped portion depends from said first shoulder into said container with the body supported on said dome-shaped portion;

said body enclosing portion and said support means being adapted to assume a second orientation wherein said dome-shaped portion is inverted with said upper rim supported by and contacting said first shoulder and said dome-shaped portion being located essentially completely outside said container, said support means being inverted with said support means upper rim supported by and contacting said first shoulder and said central section being located closely adjacent said container skirt upper rim, the body being supported by said support means central section to be located above said container with communication between that body and the environment being established via said perforate dome-shaped portion while communication between the body and the interior of said container is established via said perforated support means central section; and an imperforate lid removably positioned on said imperforate container wall to close said container.

2. Storage device for bodies which are to be exposed to the environment, comprising:

an outer holder means having a bottom and a wall connected at one end thereof to said bottom;

a support web attached to said outer holder wall and oriented to extend over said bottom, said support web having a plurality of holes defined therethrough;

an imperforate lid removably attached to said outer holder means wall;

a plurality of inner container means, each inner container means including an imperforate container supported on said web at one of said holes in a first orientation and having a bottom and a wall connected at one end thereof to said bottom and having an elongate skirt on another end thereof, said container skirt having an upper rim, and said container wall including an offset portion located near said skirt, said offset portion defining a first shoulder;

a body enclosing portion accommodated inside said container to prevent communication between a body stored inside said body enclosing portion and the environment, said body enclosing portion including a cup portion having a wall which includes a perforated dome-shaped portion and a curved wall, said dome-shaped portion wall having an upper rim and being offset from said dome-shaped portion to define a second shoulder, said dome-shaped portion having a body-supporting apex remote from said upper rim;

a support means having a perforate central section and an elongate wall having an upper rim which is offset from said central section, said support means wall being attached to said central section, said central section including a body-supporting section;

said second shoulder supported on said first shoulder and said body enclosing support means supported on said second shoulder so that said dome-shaped portion depends from said first shoulder into said container with the body supported on said dome-shaped portion;

said body enclosing portion and said support means being adapted to assume a second orientation wherein said dome-shaped portion is inverted with said upper rim supported by and contacting said first shoulder and said dome-shaped portion being located essentially completely outside said container, said support means being inverted with said support means upper rim supported by and contacting said first shoulder and said central section being located closely adjacent said container skirt upper rim, the body being supported by said support means central section to be located above said container with communication between that body and the environment being established via said perforate dome-shaped portion while communication between the body and the interior of said container is established via said perforated support means central section; and an imperforate lid removably positioned on said each imperforated container wall to close said container.

* * * * *